July 13, 1943.    J. KATZMAN    2,324,304
TURBIDITY METER
Filed Aug. 24, 1939

INVENTOR.
JACOB KATZMAN
BY Ostrolenk & Greene
ATTORNEYS

Patented July 13, 1943

2,324,304

UNITED STATES PATENT OFFICE 2,324,304

TURBIDITY METER

Jacob Katzman, New York, N. Y.

Application August 24, 1939, Serial No. 291,695

2 Claims. (Cl. 88—14)

This invention relates to turbidity meters, that is, to means for measuring the density of a colloidal suspension or of a solution for the purpose of determining the clarity of the liquid and the relative amount of foreign substances present therein.

In many industries and processes, the purity of a particular liquid used therein may vary under different conditions and in relation to its use. At a certain point in the process or use, the liquid, as for instance, oil or electrolyte or other liquids, may have developed such characteristics owing to the precipitation of various components thereof or owing to changes or additions to the liquid of foreign matter as to render such liquid useless or impractical for the particular purpose.

The particular condition of the liquid can scarcely be determined by inspection. In various industries and uses, experimental methods have determined after what period of time a particular liquid may become impractical for use and at such fixed intervals removal or replacement of the liquid is recommended. Where in particular cases the liquid may not have become impractical for use at that particular time, then a change of the liquid will result in unnecessary waste; while inferior products may result when a liquid in a particular instance may become impractical for use within the time period set.

Analyzing the liquid for the purpose of determining the quality of the liquid at different periods is both impractical and inconvenient. It is therefore necessary to find a more practical and convenient method for immediately determining at any particular moment what the specific quality of the liquid is.

Solutions or colloidal suspensions of different strengths as is well known, offer differing resistances to the passage of light rays. Various instruments have been devised for the purpose of determining the density of the solution or suspension by means of the impedance offered by it to the passage of light. Such instruments have been inconvenient and cumbersome and it has been necessary to extract sufficient liquid from the vat or container used in the process and place such liquid in the instrument for the purpose of determining the particular quality of the liquid.

In no case has an instrument been devised which will obviate the necessity for removing a portion of a liquid from its container to the instrument itself for testing. In no case has a convenient immersible turbidity meter even been devised or used.

An object of my invention therefore is to provide means whereby the resistance offered by a particular liquid to the passage of light may be determined, said means being immersible in the liquid without any necessity for removing any portion of the liquid or chemically analyzing any portion thereof.

A further object of my invention is to provide in an immersible turbidity meter, a ready and simple means for determining the resistance offered by the liquid, in which the meter is immersed, to the passage of light.

Still another object of this invention is to provide a simplified means for comparing the turbidity, density or relative presence of foreign substances in liquids.

Other objects and uses of this invention will in part be apparent and in part pointed out in the following specification and drawing, in which.

Figure 1:
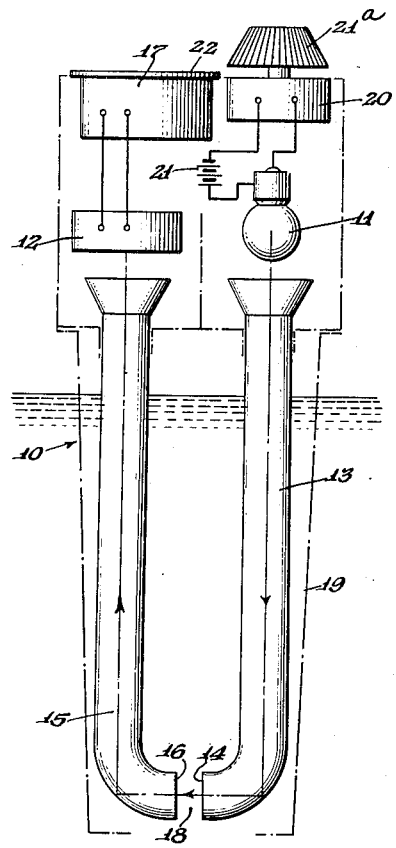
Figure 1 is a schematic view of a preferred form of my invention showing one method of transmission of the light through liquid to the comparison element.

Referring now to Figure 1, I have shown in schematic simplified form an arrangement whereby the resistance offered to the passage of light by a liquid may be readily determined by immersion of one end of the turbidity meter into the liquid itself. The turbidity meter 10 comprises a light source 11 and a photoelectric cell 12. The rays of light from the light source 11 are conducted by means of the tube 13 to the light emission area 14. The tube may be formed of quartz so that it will bend the light rays to follow a desired path or may be formed of Lucite or it may even be a hollow or solid glass tube suitably coated with a reflecting surface and, if desired, an outer darkened protective surface. Where a hollow tube is used, then it may be necessary to cover the light emission area 14 with a transparent light transmitting but liquid excluding medium. Obviously, any other suitable light transmitting means may be used which would cause the rays to issue from the area 14.

The tube 15 likewise constitutes a light transmission tube preferably, although not necessarily, equal in properties and characteristics to the light transmission tube 13. Tube 15 has a light receiving surface 16 which will receive the light rays from the light emitting surface 14. A light ray striking the surface 16 will be transmitted along the tube 15 to the photoelectric cell 12. The minute variations in the current induced in the photoelectric cell 12 by variations or differences in the light received thereby will be registered on a microammeter or galvanometer 17 having a calibrated dial 22.

It will thus be obvious that by means of the immersion of the turbidity meter, a portion of the liquid to be tested automatically enters the region 18 between the light emitting and light receiving areas 14 and 16 whereby the intensity of the light received by the area 16 will be varied in accordance with the density of the liquid and the resistance offered by such liquid to the passage of light. Such variations in the intensity of the light will cause variations in the intensity of the current generated by or through the photoelectric cell and will correspondingly cause variations in the indicating pointer of the microammeter.

The ammeter may by proper experimentation be calibrated to be read not merely in terms of the current transmitted, but in various grades, densities, or conditions of the liquid thus measured.

The entire turbidity meter 10 may in special cases be a self-contained easily portable unit, all the parts thereof being readily mountable within a single container; its size or at least the relative sizes of the tubes 13 and 15 and their casings 19 being in cases of this type such that the end of the meter comprising the region 18 may be readily immersed in a restricted area, as, for instance, the oil tank of an automobile. But while my invention makes such a portable arrangement possible, it should be clear that the novelty of the instrument is by no means limited thereto. As a matter of actual practice, the light emitting and receiving areas may be permanently fixed in the bath or electrolyte and other members mounted in suitable relationship thereto while the meter may be mounted outside the vat or in a supervisor's office or in any other suitable place. Such permanent arrangement may be particularly desirable where continuous control is required of the condition of the bath. Likewise, the parts may be arranged in a semi-permanent mounting, and the relative location or shape of the members changed, the principal requirement being that the area 18 be immersible in the bath. This applies not only to this particular form but also to the other forms herein described.

As seen in Figures 2, 3, 4 and 5, this invention may take many varied forms all following the same principle, it being important in each case that the turbidity meter be immersible or immersed in any desired liquid, even while said liquid is in use in a particular process, the said meter giving an immediate and direct reading.

Figure 2:
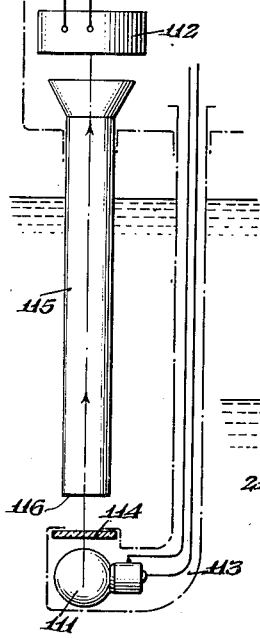
Figures 2, 3, 4 and 5 are schematic views of modified forms of the invention shown in Figure 1, showing different methods of transmission of the light through the liquid.

As seen in Figure 2, the light source 111 need not necessarily emit rays which are conducted into the liquid by a tube, but the light source may actually be located in a tube 113 which is either permanently or temporarily immersed in the liquid, the rays from the light source then being directed upon the receiving area 116 of the tube 115, the process thereafter being the same as that shown in connection with Figure 1.

It will be clear that in any of the embodiments of Figures 1–5 inclusive, in order to allow for variations in the intensity of the light, a resistance 20 (Figure 1) may be provided in series with the source of current 21 which actuates the light bulb. By this means, the intensity of the light emitted may be varied and before immersion, the turbidity meter may be set in the zero position by adjustment of the resistance so that the microammeter will read at a predetermined "zero" marking which, of course, will not necessarily be that for zero current.

The resistance 20 should therefore be a variable one and a knob 21a may be provided extending outside of the casing in order to provide for the simple adjustment of the resistance.

The source of current 21 may be batteries of various types, an ordinary electric outlet, or any other means which will activate the light source 11.

Another embodiment of the same principle utilizing the same type of apparatus but a slightly different type of light conductor is shown in Figure 4 wherein again the light source 211 may be immersed in the liquid, the light source being at the bottom or end of the tube 213. The light from the bulb 211 passes thru the glass partition 214, through any liquid which may be present in the region 218 and is received upon the glass partition 216 and thereafter reaches the photoelectric cell 212, the operation being exactly the same as that hereinbefore described.

Here again the entire meter may be encased in a single unit which may be light for ready portability, or parts thereof may be permanently fixed in the bath with the meter located at some suitable position; or suitable mounting brackets may be provided for permanent or semi-permanent mounting of the member or members. In this form it is helpful in order to obtain uniformity between different readings of the density of the same liquid to make sure that the outer shell or casing is immersed so that the glass partition 216 is below the level of the liquid. In order to accomplish this result in the case of a portable outfit, a suitable mark may be made upon the outer shell or casing to guide the user.

Figure 3:
Figure 4:
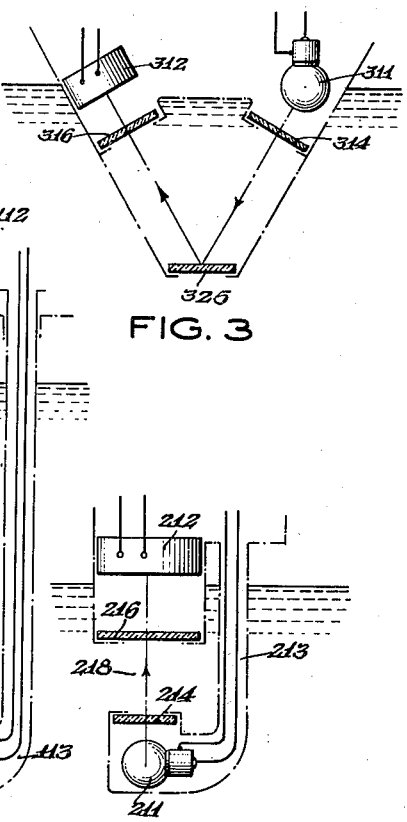

In another form such as that shown in Figure 3, a reflecting surface 325 may be utilized in the outer shell or casing and built into the bottom thereof. The light from the bulb 311 is emitted through the glass partition 314, striking the reflecting surface 325, is received through the glass partition 316, and impinges upon the photoelectric cell 312, the operation again being exactly the same.

In this case also it is important to so arrange the turbidity meter that the glass partitions 314 and 316 are below the level of the liquid when the turbidity meter is in use, in order to obtain uniformity in readings. For this purpose, a suitable mark may be made upon the shell. For permanent installations, the reflecting surface 325 may be mounted on or be a part of the bottom of the vat or a side thereof, the other members being suitably arranged.

Figure 5:

In any of the instances shown in Figures 1–4 inclusive, as well as in Figure 5, the outer shell where it is used, may be so constructed as to provide an opening therein so that the liquid may enter into the region 18 of, for instance Figure 1 or similar regions of the equipment shown in the other schematic diagrams so that a proper reading may be made, it being important that liquid fill the entire region between, for instance, the surfaces 14 and 16 (Figure 1), 114—116 (Figure 2), 214-216 (Figure 4), or the region bounded by the glass partitions 314 and 316 and the reflecting surface 325 (Figure 3).

For this purpose it will be clear that the outer shell may constitute a complete enclosure for all of the parts of the instrument, it being necessary only to provide a suitable perforation, opening or entry at or near the region into which the liquid to be tested must flow in order to obtain the proper comparison. This opening should be as small as is consistent with rapid inflow and outflow of the liquid and preferably should be at the very bottom of the instrument to permit the liquid to flow out readily after the test. To obviate errors due to external light in a meter which depends on light intensity attributable to a particular source or a comparison of light intensities, a shield or cover for the instrument may be provided to exclude outside light sources as far as possible. For this reason, the perforation or place of entry of the liquid will be preferably at the bottom of the instrument so that the most difficult possible path is provided for the entry of outside or stray light.

In an enclosed tank or vat with a suitable opening for immersing the meter it is not necessary to consider this condition. In an open tank, a suitable shield or cover may be used.

In permanent or semi-permanent installation, the depth of the vat or its conformation may provide the desirable shielding effect; or the vat when built may have the instrument built as a part thereof.

Likewise, various other arrangements may suggest themselves for permanent installations. Thus the light emission area may terminate near a side or the bottom of the vat; and a window may be provided in said vat opposite such light emission area to transmit the light to the photocell.

In ordinary use or for the usual instrument for ordinary purposes, the mere placement of the entry for the liquid at the bottom of the meter will be sufficient to exclude outside or foreign light at least to such extent that it will not interfere appreciably with the readings.

Furthermore, it will be seen that where comparisons are made on the spot between a pure liquid and a liquid the turbidity of which may have varied from the pure state, then, if the liquids are in similar containers, a comparison of the readings of the used and pure liquids if made under the same outside conditions, may nevertheless be accurate in spite of the entry of foreign undesired light into the light comparison region.

Where extremely delicate differences may be important however, then instead of a simple opening through the shell 19 through which the liquid may enter, a tortuous path may be provided for the entry of the liquid, said tortuous path being coated with a light absorbing surface and having a sufficient number of bends to exclude any stray foreign light which may be present.

As seen in Figure 5, this invention may be varied in many different ways without departing from the spirit thereof. Thus, instead of tubes or reflectors for guiding the light rays the light source 411 may be at the bottom of the tube, its rays entering the prism 430, the prism bending the rays so that light is emitted from the surface 414 into the region 418, passing therethrough and impinging on the surface 416 of the prism 431 and being bent thereby and directed towards the photoelectric cell 412 for purposes hereinabove described. Except for the type of light transmitting medium used, the operation is exactly the same as that described in connection with the prior figures.

This meter may be used in many and different ways. Thus for instance, in testing the quality of oil in an automobile, the meter may be calibrated in units showing the presence of impurities or in various markings indicating "good," "fair" or "unusable." Or the meter may, immediately before being placed in the oil tank of the automobile be placed in a small tank of similar conformation containing pure oil and then a comparison between the readings may be made, it having previously been determined by experiment what difference in readings will necessitate a change in the oil.

Likewise in sewage disposal plants where the quality of the purification work at any particular time needs to be quickly determined, the meter may be placed in the inflowing current of sewage and a reading taken and then it may be placed in the outflowing current of purified sewage and a reading taken, the difference between the two readings showing the efficiency of the plant at any particular instant. For this purpose, a permanent or semi-permanent installation of two meters may simultaneously, on two indicators, give an immediate reading at any particular instant of the effectiveness of the process. Or a permanent or semi-permanent system such as that described in Figure 7. working through two immersion members and two photocells may actuate a single meter to establish the effectiveness of the process.

Likewise, the meter may be used to determine the efficiency of the bath in various industrial applications such as electroplating, dyeing, etc., where the quality and density of the liquid and the presence of impurities or other substances may immediately be determined.

In fact, by connecting the photoelectric cell to appropriate control apparatus, the turbidity meter may actually be used to control processes such as electroplating or dyeing where variations in the turbidity of the bath may, by instantaneously causing a change in the flow of current, tend, through suitable amplifying apparatus or relays, to control the process itself.

While there have been here described means whereby the turbidity of the liquid may be directly recorded upon the microammeter in terms of the intensity of the current generated by or through the photoelectric cell and means whereby, the microammeter being calibrated in suitable turbidity or other units, the turbidity of the liquid may be read off directly, other means for constructing and using the turbidity meter within the spirit of the present disclosure may readily be devised.

Figure 6:
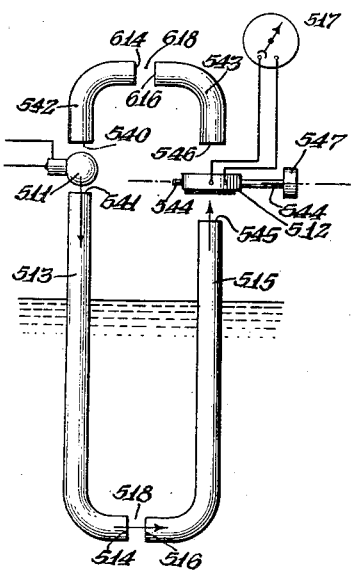
Figure 6 is a schematic view of a modified form of my invention wherein a direct comparison of the values of light transmitted through two different media may be made.

Thus, in the embodiment shown in Figure 6, there is provided a means whereby the original strength or setting of the light source is immaterial and therefore a variable resistance such as 20 of Figure 1 will be unnecessary. The light source may vary in intensity and in fact the light source if it comprises an ordinary bulb may be used until the bulb wears out and actually emits no further light. In this embodiment the light from the light source 511 is directed upon the ends 540 and 541 of the tubes 513 and 542. The light source 511 may be located directly between the ends 540 and 541 or the light rays emitted thereby may be guided to the ends 540 and 541 of the tubes 542 and 513. The tubes in this embodiment may be constructed in the manner hereinbefore described of quartz or Lucite or glass suitably coated and treated in the manner hereinabove described in connection with Figure 1.

The light transmitting tube 513 terminates in a light emitting area 514 adjacent the region 518. The light emitted from the light transmitting area 514 into the region 518 is received on the area 516 of the light receiving tube 515 and guided therefrom to the photoelectric cell 512. The light passing through the tube 542 is emitted by the light emission area 614 into the region 618 received upon the area 616 and transmitted through the tube 543 to the photoelectric cell 512. The photoelectric cell 512 is connected as in the manner shown in Figure 1 to the microammeter 517.

The light bulb 511 may be actuated in the manner shown in Figure 1 by a suitable source. As is hereinbefore pointed out, a suitable opening or perforation may be provided at the bottom of the shell or casing of the turbidity meter to permit the entry of liquid into the region 518. Where the turbidity meter is to be used in the testing of one type of liquid only at all times, then a quantity of pure unused liquid may be inserted in the meter in the region 618 between the areas 614 and 616 and sealed therein against dust and light, a simple small container being provided around the region 618 to confine the liquid therein. The photoelectric cell 512 may then be pivotally mounted upon the turning axis 544 so that it may selectively be turned towards the area 545 comprising the end of the tube 515 or towards the area 546 comprising the end of the tube 543. A suitable knob 547 extending outside the casing may be provided to facilitate the turning of the photoelectric cell 512. Thereafter when it is desired to use the instrument, the light 511 is turned on by closing the circuit (not shown) to the light source in any suitable manner, and the photoelectric cell is by means of knob 547 turned towards the area 546 where the light transmitted from the bulb 511 through the tube 542 through the pure liquid in the region 618 and through the tube 543 may impinge upon the photoelectric cell and the reading of the microammeter 517 then taken.

Thereafter the photoelectric cell is by means of the knob 547 rotated so that it faces the area 545 of the tube 515 and the light from the bulb 511 passing through 513 and the liquid to be tested in the region 518 and the tube 515 again impinges upon the cell, resulting in another reading of the microammeter 517.

A comparison between these two readings will then give the relative turbidity of the liquid tested. By this means, therefore, as long as the bulb 511 emits any light at all, a true comparison may be made between the pure and impure liquids. The small amount of the pure liquid contained in the region 618 is a permanent part of the instrument sealed therein against both light and dust.

Whatever the intensity of the light bulb, the comparison between the two readings will give the relative turbidity of the liquid being tested, and a suitable table may be provided as an integral portion of the outer shell of the instrument itself translating various differences into various turbidity values so that an immediate determination of the quality of the liquid being tested may result.

The light comparison may, if desired, be made on an absolute basis, that is the region 618 may not be filled with any liquid at all but may be simply sealed and closed so that neither dust nor light may enter. Then the liquid entering in the region 518 may be compared with an absolutely perfect condition wherein the light in the region 618 is not interfered with at all by any liquid. In such case, a pure liquid will give a certain set or predetermined difference and the difference will vary in accordance with the purity of the liquid.

This means may also be used in installations where immediate comparison is desired between the liquids in two baths during a process, the area 518 being immersed in one of the baths and the area 618 in the other.

In Figure 6 the tubes 542 and 543 are shown as of a different length from the tubes 513 and 515. The relative length of the tubes is immaterial as long as the tubes themselves do not absorb an appreciable amount of light emitted by the light source 511. If the instrument is to be extremely delicate in adjustment and if it is to show minute differences, then in order to prevent the instrument from being inefficient, the tubes 513 and 542 may be equal and the tubes 543 and 515 may also be equal both in their length and other properties so that whatever light absorption or whatever changes in the characteristics of the light may take place during its transmission from one point to the other, such variations will have no effect upon the test itself; it should be noted, however, that the inequalities in the transmission of the light may be compensated in various ways, either by movement of the light source or the photoelectric cell closer to the end of one or the other of the tubes, by the use of screens in any of the gaps or in any other suitable manner. Also the tube ends 514 and 516 should preferably be spaced apart a distance equal to that between the ends 614 and 616. The instrument shown in Figure 6 may be slightly varied to give a direct reading showing the difference which in Figure 6 must be arrived at by a turning of the knob 547 and a comparison of the readings. That is, the apparatus may be so constructed that the instrument will show the difference between the pure and impure readings directly without mathematical calculations of any kind; or the instrument may be so calibrated as to read in turbidity units directly.

Figure 7:
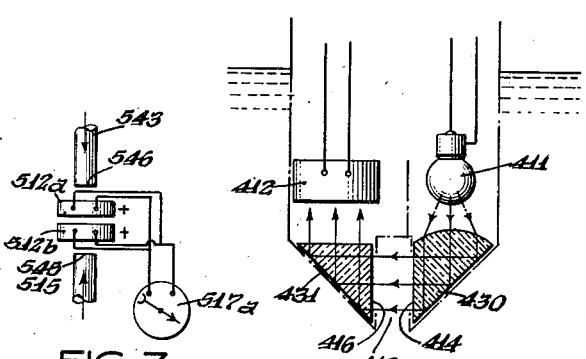
Figure 7 is a fragmentary view of a modification of a portion of the structure of Figure 6.

This may be accomplished by the variation shown in Figure 7 wherein, instead of providing a single photoelectric cell 512, between the ends 545 and 546 of the tubes 515 and 543, two photoelectric cells 512a and 512b may be provided therebetween.

Both of these photoelectric cells may be connected to the same microammeter 517a. The positive pole of photoelectric cell 512a and the negative pole of the photoelectric cell 512b being connected to one terminal of the microammeter 517a and the negative pole of photoelectric cell 512a and the positive pole of photoelectric cell 512b being connected to the other terminal of the ammeter 517a.

It will thus be seen that the photoelectric cells are connected in opposition to each other and the microammeter 517a will show the difference between the intensities of the currents generated by these photoelectric cells. In this way, a direct comparison may be made between the pure liquid and the liquid to be tested and a direct reading showing the quality of the liquid to be tested may be had. For this purpose again it should be noted the light transmitting qualities of the tubes leading to the area 546 should be equal to the light transmitting qualities of the tubes leading to the area 545 so that the differences in the light paths themselves will not render the meter inaccurate, or suitable adjustments may be made as herein described. And likewise the photoelectric cells 512a and 512b should also be equal in their respective qualities or suitable adjustments made so that whatever differences do occur shall be differences in light intensity resulting from the passage of the light through the liquid and from no other cause.

While this instrument has been described as applicable to the determination of the turbidity of liquids, it will be clear that it can, in suitable arrangements, test the qualities or density of gases and vapors, and even the air within a room or chamber as compared with that elsewhere. For this reason, the word "fluid" in the appended claims should be deemed to include liquids, gases and vapors.

It will thus be seen that my invention is capable of many and diverse embodiments and uses. I prefer, therefore, to be limited not by the specific disclosures herein, but only by the appended claims.

I claim:

1. A turbidity meter for testing the turbidity of a liquid, said meter comprising a light sensitive medium and a light source; a light conducting member having one end adjacent said light source and the other end immersible in said liquid for guiding the light emitted therefrom through a predetermined amount of a liquid while said liquid remains in a container, and a similar member spaced by said predetermined amount from said first member for guiding the said light from said liquid to said light sensitive medium; said members being substantially parallel to and co-extensive with each other; said light source and said light sensitive medium being disposed at corresponding ends of said members; the ends of said members defining said predetermined amount of liquid being remote from said light source and said light sensitive medium, and being insertable into said liquid while said light source and light sensitive medium remain above the level of said liquid; and means operable by said light sensitive medium for determining the intensity of the emerging light; said last mentioned means being arranged to directly indicate the turbidity of said liquid.

2. A turbidity meter for testing the turbidity of a liquid while said liquid remains in a container, said meter comprising a light source, a photosensitive medium and means operable by said photosensitive medium for determining the intensity of light impinging thereon, and a light conducting tube, one end of which is disposed adjacent said light source and the opposite end of which is remote from said first end and disposable within said liquid; and a second light conducting tube, one end of which is remote from said first end and disposed adjacent said photosensitive medium and the opposite end of which is disposed opposite and in proximity to the end of the first tube disposable in the liquid and spaced therefrom by a predetermined amount to define a predetermined amount of liquid; said tubes being substantially parallel to and co-extensive with each other; said light source and said photosensitive medium being disposed at corresponding ends of said tubes; the ends of said tubes defining said predetermined amount of liquid being insertable into said liquid while said light source and said photosensitive medium remain above the level of said liquid; said light intensity determining means being calibrated to indicate the turbidity of said liquids.

JACOB KATZMAN.